Dec. 24, 1940.　　　　P. LANDROCK　　　　2,225,747
PHOTOGRAPHIC METHOD
Original Filed July 6, 1938　　6 Sheets-Sheet 1

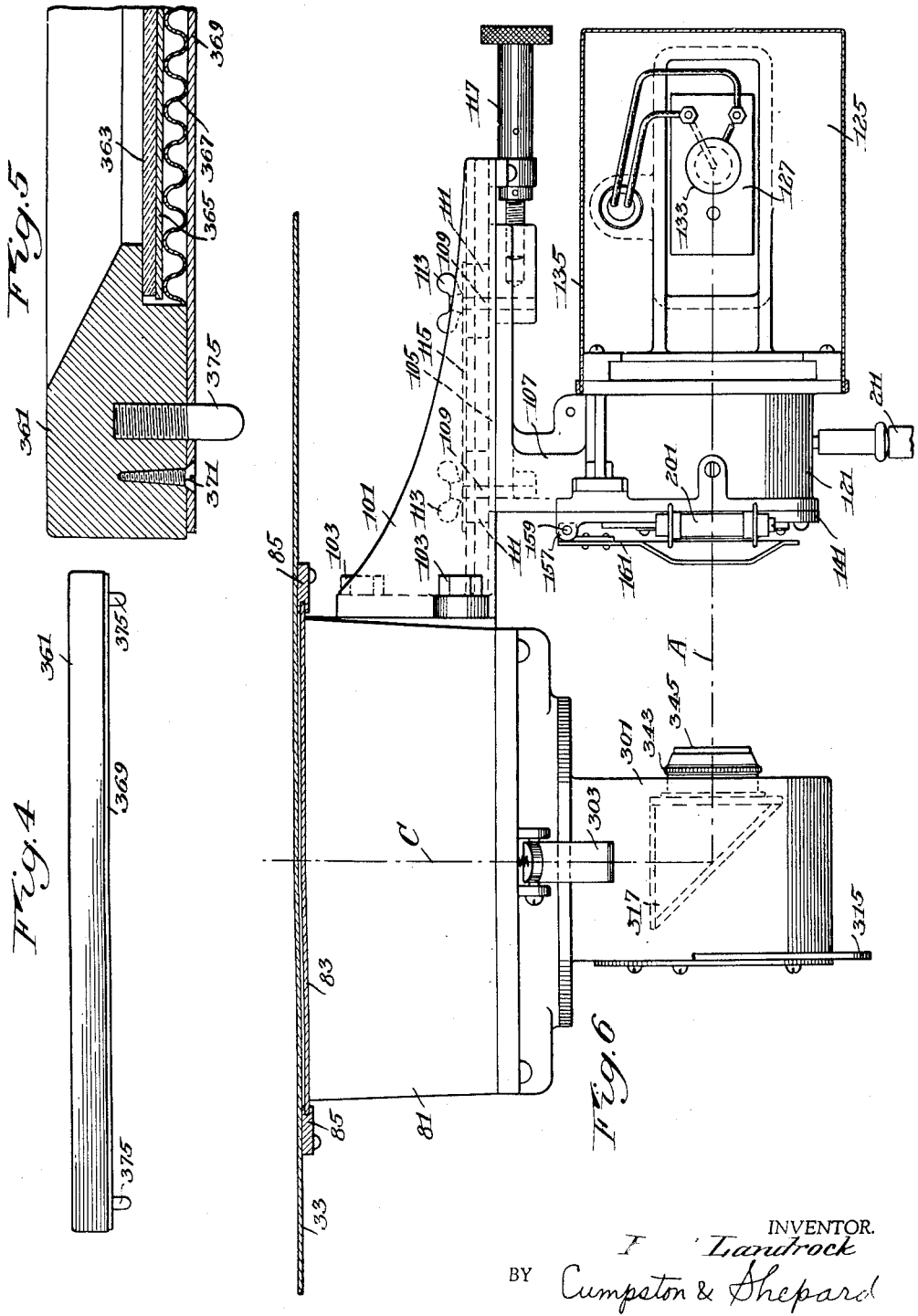

Dec. 24, 1940.  P. LANDROCK  2,225,747
PHOTOGRAPHIC METHOD
Original Filed July 6, 1938  6 Sheets-Sheet 4
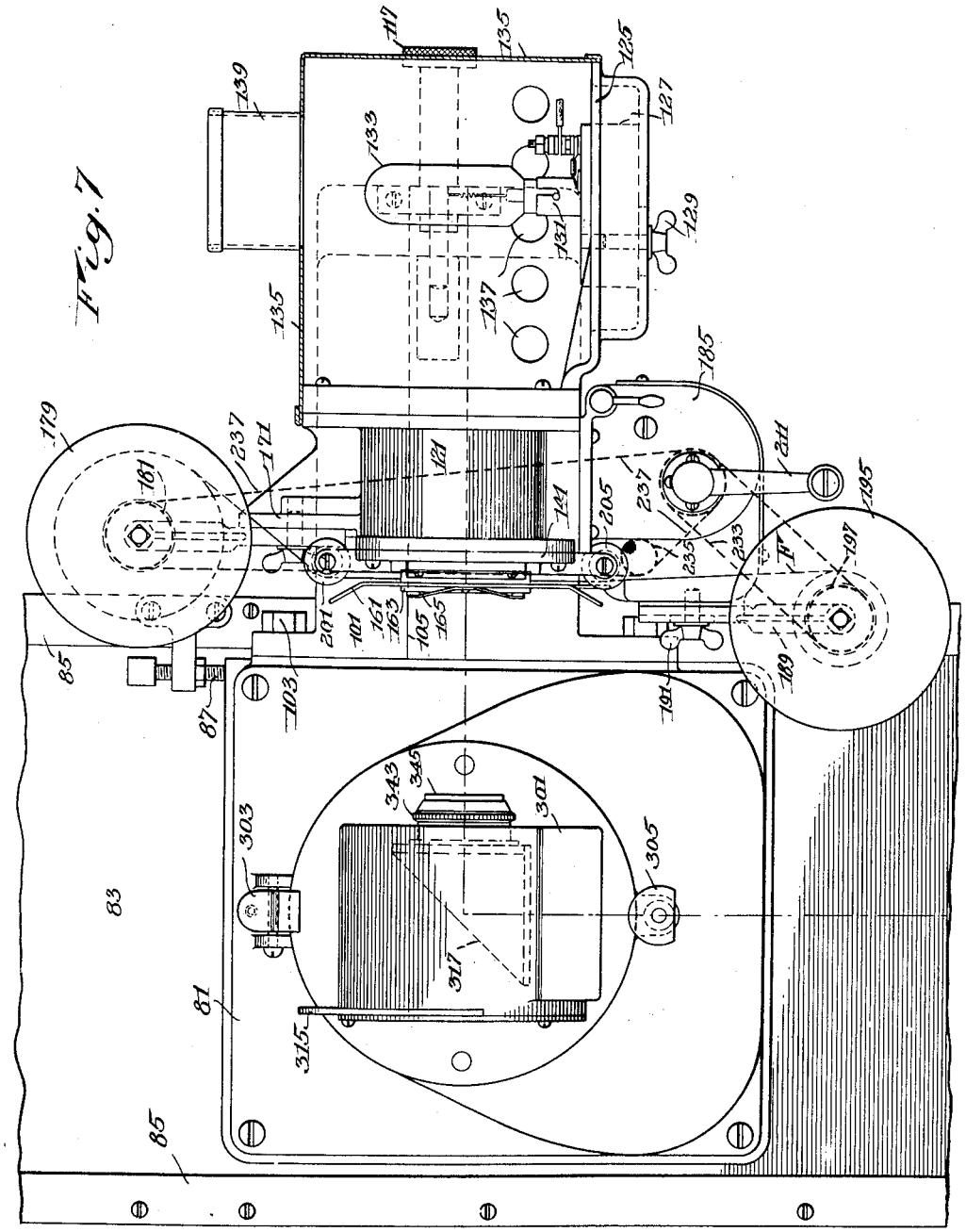
INVENTOR.
Paul Landrock
BY Cumpston & Shepard
his ATTORNEYS

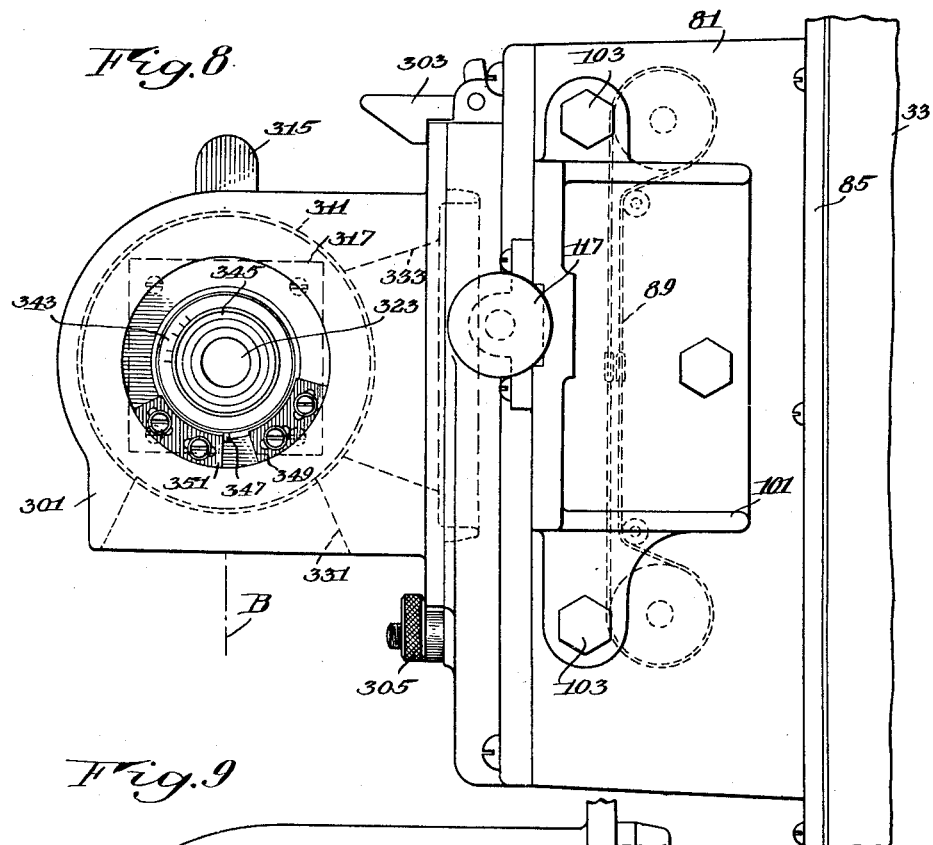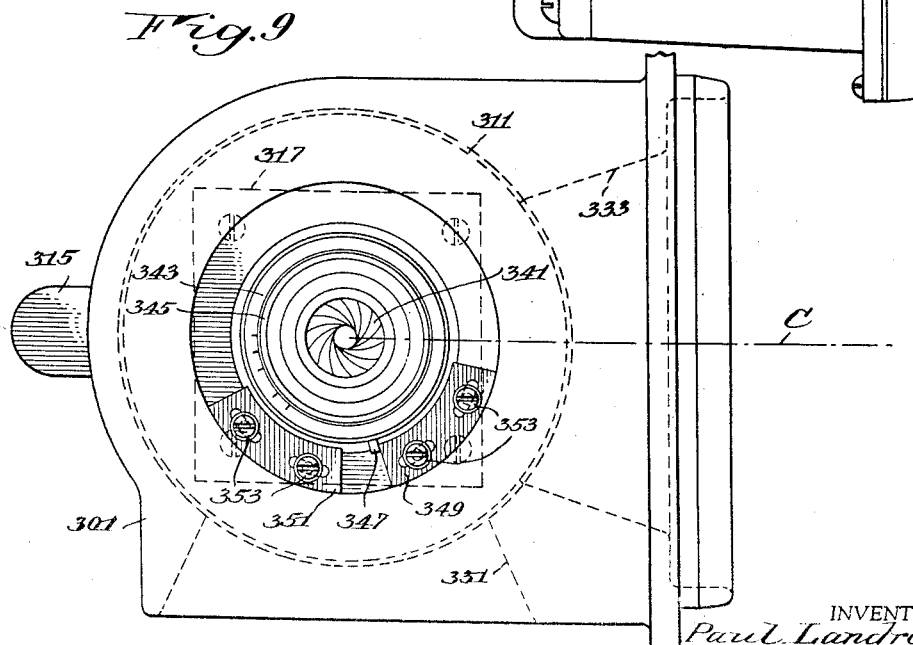

Dec. 24, 1940.   P. LANDROCK   2,225,747
PHOTOGRAPHIC METHOD
Original Filed July 6, 1938   6 Sheets-Sheet 6
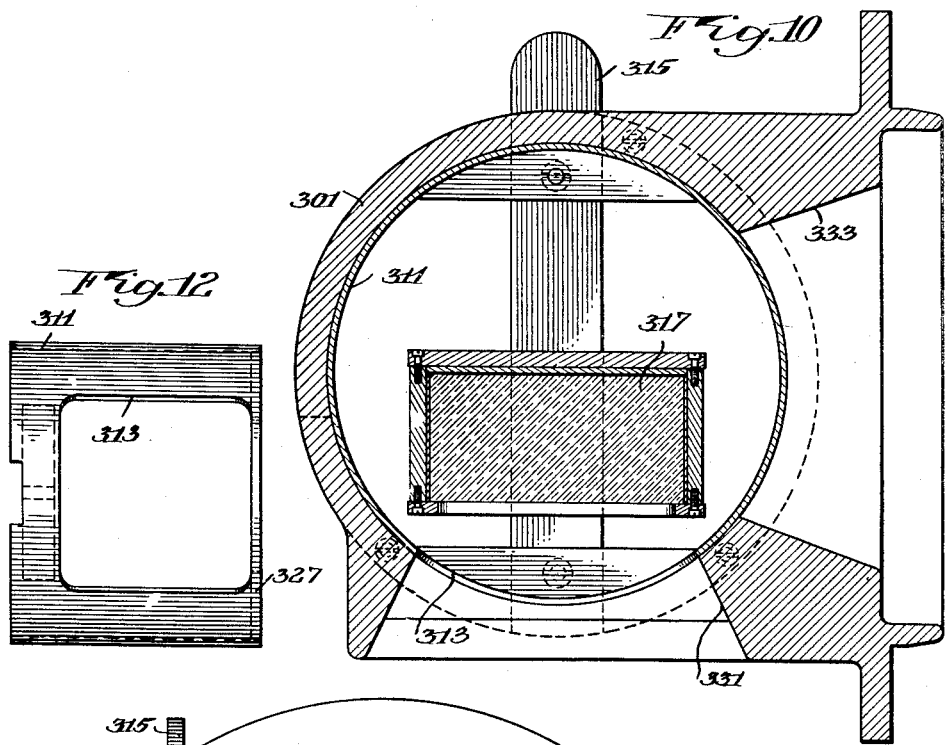
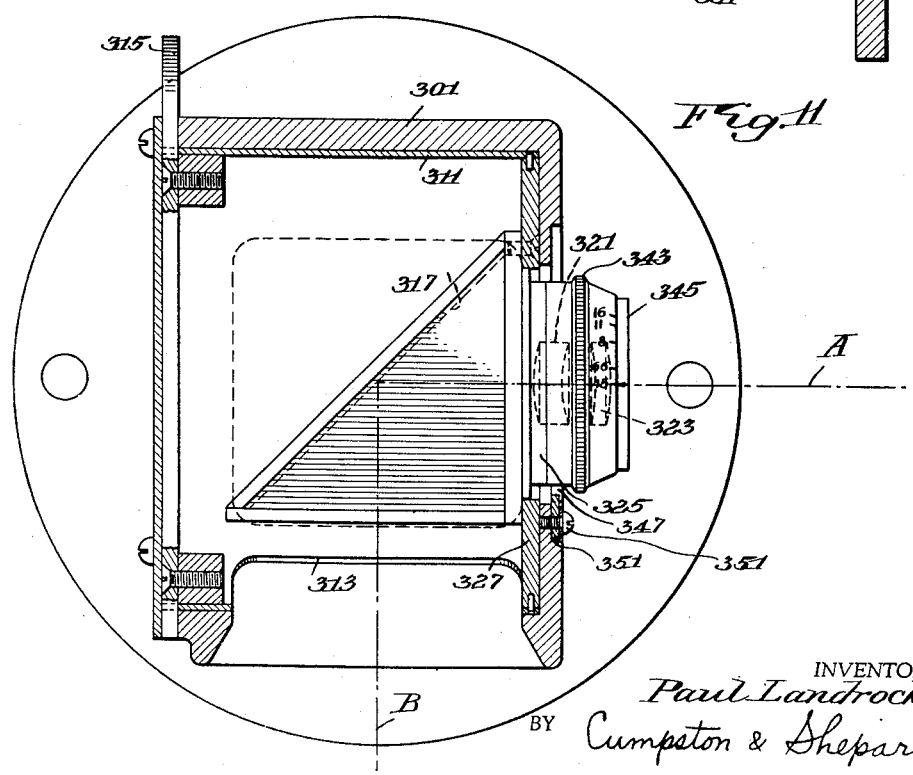
INVENTOR.
Paul Landrock
BY Cumpston & Shepard
his ATTORNEYS Patented Dec. 24, 1940

2,225,747

UNITED STATES PATENT OFFICE 2,225,747

PHOTOGRAPHIC METHOD

Paul Landrock, Rochester, N. Y., assignor to Photostat Corporation, Providence, R. I., a corporation of Rhode Island Original application July 6, 1938, Serial No. 217,710. Divided and this application September 5, 1939, Serial No. 293,391

5 Claims. (Cl. 88—24)

This invention relates to a method of making photographic reproductions, and deals especially, though not exclusively, with a method of producing enlarged reproductions of small sized images, such as those on motion picture film or small slides or pieces of cut film.

An object of the invention is the provision of a generally improved and more satisfactory method for making enlarged reproductions of small images.

Another object is the provision of a method of photographic reproduction in which no dark room is required.

Another object is the provision of a method whereby, without using a dark room, it is possible to view an enlarged image to inspect it to make sure that it is of the correct subject matter, correct size, etc., and then to make a photographic print thereof, with assurance that the print will be of exactly the same size as the image which has been viewed.

A further object is the provision of a method of viewing images of proposed reproductions, and then making photographic prints of such images, with a minimum of time and effort.

It is believed that the method of the present invention can be best understood by first describing a preferred illustrative embodiment of apparatus which is especially useful in practicing the method. Accordingly, such apparatus is shown in the drawings, in which Fig. 1 is a side elevation of a preferred embodiment of apparatus for carrying out the method of the present invention, showing the parts in such position that the enlarged image is projected upon the viewing screen;

Fig. 4 is a side elevation thereof;

Fig. 5 is a vertical section through the viewing screen assembly;

Fig. 6 is a plan of a portion of the apparatus, including the light projecting means, transparency holding means, and optical system;

Fig. 7 is a front elevation of the same;

Fig. 8 is a side view of part of the optical system and the front portion of the camera forming part of the apparatus, with the movable optical parts in a position to project the image upon the viewing screen;

Fig. 9 is a similar view with the optical parts shifted to a position to project the image onto the focal plane of the camera, to make a photographic print;

Fig. 10 is a vertical section through the optical parts shown in Figs. 8 and 9;

Fig. 11 is another vertical section through the same, taken on a plane at right angles to the plane of Fig. 10, and Fig. 12 is a view of the prism carrier removed from other parts.

The same reference numerals through out the several views indicate the same parts.

Figure 1:
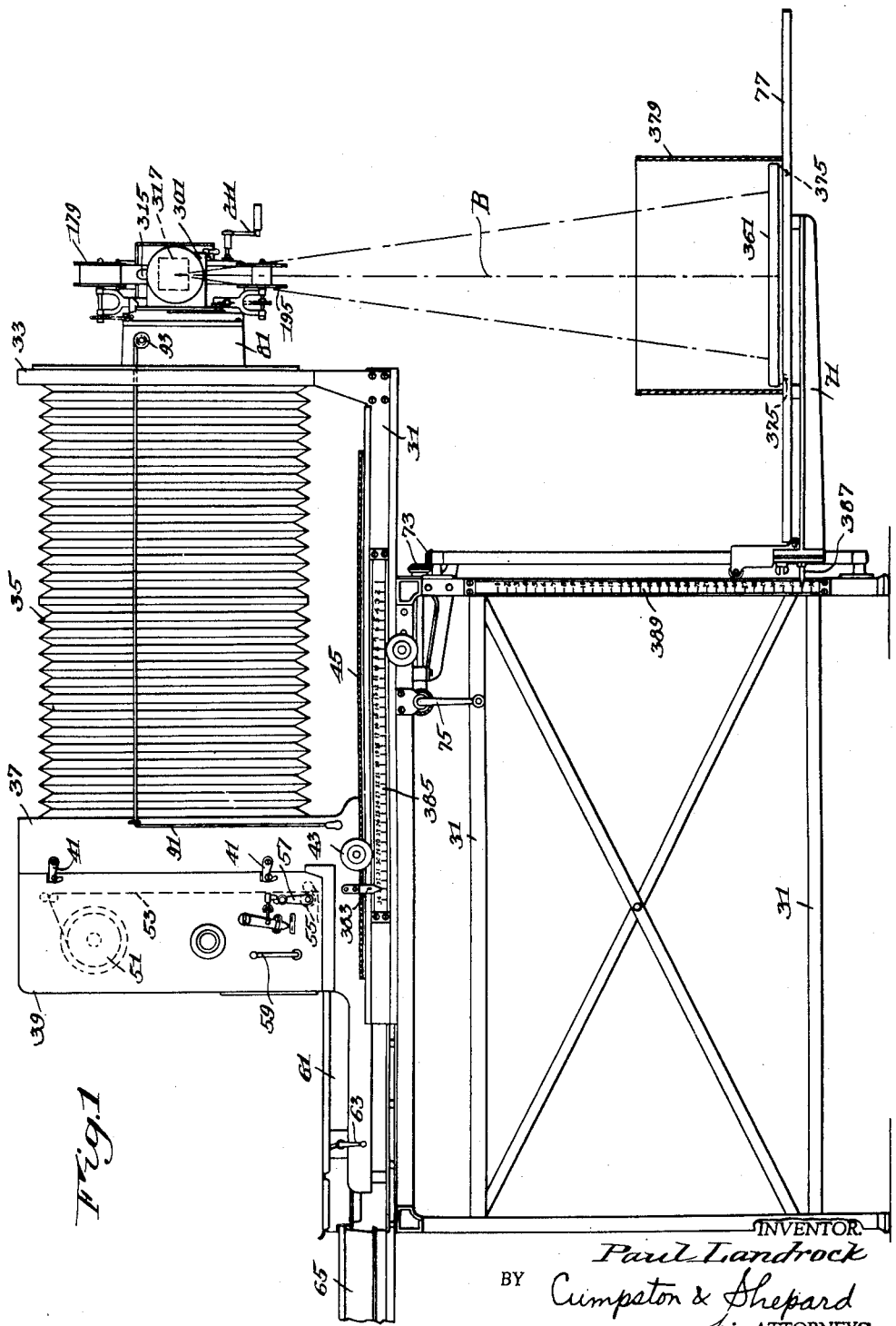

Referring now to the drawings, the preferred illustrative embodiment of apparatus which may be used in practicing the present method, comprises a stationary frame indicated in general at 31 (Fig. 1) on which is mounted a camera front 33 connected by the usual bellows 35 to a camera body having a forward section 37 and a rear or magazine section 39 hinged to the forward section 37 so that it may be opened when the latches 41 are released.

The camera front and body are adjustable toward and away from each other for purposes of focusing. This may be accomplished by mounting the body stationarily on the frame 31 and by moving the front along the frame, or preferably by mounting the front 33 stationarily on the frame 31, and by moving the body backwardly and forwardly along a track on the frame, by means, for example, of a pinion on the shaft of a hand wheel 43 mounted on the body, which pinion engages a rack 45 on the stationary frame 31.

The front, bellows, and body may be of the same construction as one existing type or style of commercial copying camera known as the "Photostat" camera, which type or style is widely used and well known to those skilled in the art. It includes, within the magazine section 39, means for holding a roll 51 of photo sensitive material such as paper coated with a photographic emulsion, and means for holding a portion of the web or strip of paper flat in the focal plane of the camera as indicated at 53, together with roller means 55 operated by a handle 57 for feeding the sensitized material to draw an exposed portion thereof out of the focal plane 53 and to draw a fresh unexposed portion into the focal plane, and the usual knife means operated by the handle 59 for cutting off the exposed portion of sheet material below the rolls 55, to sever it from the remaining unexposed portion. When the exposed portion is fed downwardly by operation of the rolls, it goes into a tray 61 containing a developing bath, and by operation of a crank handle 63 it may be fed rearwardly out of the developing bath and into a fixing bath in another tray 65, all as well understood by those skilled in this art. The parts 61 and 65 are preferably connected to the camera magazine 39 to move therewith along tracks on the frame 31 when the camera magazine is moved forwardly or rearwardly for focusing.

Mounted for movement upwardly and downwardly along a track at the front end of the frame 31 is a bracket 71 on which various kinds or types of copyholders may be interchangeably mounted. The bracket may conveniently be raised or lowered by means of a long screw driven through beveled gears 73 from the crank 75, in known manner. Among the kinds of copyholder which may be mounted on this bracket 71 for ordinary photocopying operations, is a large board 77, sometimes known as an engineering board, on which documents to be copied may be laid flat, beneath the usual lens and prism assembly (not shown here) employed in copying cameras of this known type.

The camera front 33 carries a housing 81 (Figs. 1, 6, and 8) projecting forwardly from a board 83 (Fig. 6) slidable vertically on the front face of the camera front 33 in guideways formed by grooves in the strips 85. As usual, upward and downward motion of the housing 81 and board 83 is limited by an upper stop 87 (Fig. 7) and by a similar lower stop (not shown), so that when the housing 81 is in its uppermost position, as illustrated in Figs. 1 and 7, the center of the housing is substantially alined with the center of the available area of the focal plane 53, thus enabling the making of full sized prints of the maximum capacity of the machine. If a print of half the size is to be made the housing 81 and its board 83 are moved downwardly into engagement with the lower stop, so that the housing is now centered opposite the lower half of the focal plane area 53, so that the photographic print may be made on the lower half of this area without exposing the upper half thereof.

Within the housing 81 is the usual shutter, preferably but not necessarily in the form of a curtain shutter, as indicated diagrammatically at 89 in Fig. 8. It may be opened by a pull on a cord 91 (Fig. 1) which is connected to a pulley 93 secured to the top shaft of the shutter.

For ordinary photocopying operations, as well understood by those skilled in the art, a lens and prism assembly is secured to the front of the housing 81. Light rays from a suitably illuminated document on the board 77 pass upwardly to such ordinary lens and prism assembly (not shown) and are bent through approximately 90° so as to pass rearwardly (when the shutter 89 is open) through the bellows 35 to fall upon sensitized material 53 in the focal plane, thus exposing it, whereupon the exposed material may be fed downwardly and cut off, and treated in the developing bath and fixing bath to make a photographic print.

The preferred embodiment of apparatus used in carrying out the method of the present invention provides a special unit to replace the ordinary lens and prism assembly, and also certain supplementary parts used with the special unit, so designed and constructed that an enlarged image of a small individual transparency or of any selected transparency from a long row or strip, can be projected downwardly onto the board 77 or onto a suitable screen placed thereon, for purposes of viewing, reading, or otherwise examining such image, or can be projected rearwardly onto the sensitized material 53 to make an enlarged photographic print of such transparency.

The word "transparency" and its derivatives, as used in this application, is not intended in a narrow or technical sense but is intended to include all films, plates, slid s, etc., which are rendered visible by light projected through them or parts of them, or from which enlarged images may be made by projecting light through them or parts of them. For instance, the word as here used includes images on motion picture film or other strip film (whether negative or positive) as well as images on glass plates or on relatively thin and transparent paper.

Referring now to Figs. 6 and 7, the preferred embodiment of apparatus for carrying out the method of the present invention includes a bracket 101 detachably secured to the housing 81 by means of removable bolts 103. This bracket 101 has an approximately horizontal guideway 105 forming a track along which is movable a second bracket 107 secured to the bracket 101 by means of the bolts 109 which extend through slots 111 in the bracket 101 and which have wing nuts 113 bearing against a slidable resilient spring plate 115 which covers the slots 111. An adjusting screw 117 mounted for rotation on the bracket 101 but held against axial movement thereon, is screwed into a tapped opening in the bracket 107, so that rotation of the screw 117 moves the bracket 107 in one direction or the other along its trackway 105 on the bracket 101, the wing nuts 113 being left sufficiently loose to allow such adjusting movement. The spring 115 holds the parts tightly together notwithstanding this slight looseness of the wing nuts.

On this bracket 107, and movable bodily therewith, when the bracket is adjusted, is what may be termed the light projecting assembly and the transparency holding assembly. The light projecting assembly includes a somewhat annular or barrel-shaped casing section 121 (Figs. 6 and 7) within which is removably mounted a condensing lens system having condensing lenses of any suitable number and arrangement. Extending rightwardly from the condenser casing 121, when the parts are viewed from the front as in Fig. 7, is a lamp housing having a floor 125 and a lamp block 127 slidable toward and away from the condenser lenses along a groove in the floor, the block 127 being held in any position to which it is set by means of a wing head 129 on a clamping bolt. On the block 127 is a lamp base 131 in which is mounted an incandescent bulb 133, the filament of which is so set (by shifting the block 127 toward or away from the condenser lenses) as to be at the focus of the condensing lens system, to produce a strong beam of parallel light rays to the left of the condensing lens system, in known manner.

Sheet metal side and top walls 135, forming part of the lamp housing, enclose the lamp 133. Air inlet holes 137 are provided in the side walls near their bottom edges, and a stack or chimney 139 extends upwardly above the top wall, so that the air may circulate within the lamp housing to keep the lamp as cool as practicable.

At the left end of the casing section 121 which holds the condensing lenses, there is a plate 141 (Fig. 7) secured to lateral flanges on the casing 121. This plate 141 has a large rectangular aperture alined with the optical axis of the condenser lens system, and around the aperture is a seat for a first plate of glass or other transparent material, held against the seat by suitable means.

The plate 141, near its top and bottom edges, is extended rearwardly of the apparatus to provide bosses 157 (Fig. 6) in which is mounted a substantially vertical pintle 159 forming a pivot for a metal plate 161 having an aperture in line with the optical axis of the condensing lens system. Extending across this aperture is a second transparent plate 163 which may be similar to or a duplicate of the first transparent plate. Resilient spring clips 165 (Fig. 7) secured to the plate 161 approximately midway of their heights, have upper and lower ends overlying the transparent plate 163 and pressing rearwardly thereon to tend to hold beveled edges of this transparent plate against the lateral edges of the opening in the plate 161 in which the transparent plate is mounted. The extreme width of the transparent plate is greater than the width of such opening, so that the beveled edges seat against the edges of the opening and prevent the transparent plate from moving entirely through the opening.

A spring is coiled around the pintle 159 and tends to swing the plate 161 toward the condenser lens system to press the second transparent plate 163 against the first transparent plate, or against an interposed film or transparency held between these two plates.

If only a part of the whole image on the transparency is to be projected and enlarged, then an opaque mask with an opening of the appropriate size may be placed on that surface of the second transparent plate 163 which is remote from the first transparent plate. The edges of the mask may be slipped under the ends of the spring clips 165, to hold the mask in place. It is but the work of an instant to take out one mask and insert another mask having an opening of a different size.

When the image to be projected and enlarged is on an individual transparency, the two transparent plates are separated from each other by swinging the metal plate 161 on its pintle 159 against the tension of the spring surrounding the pintle, and the transparency is placed between the two transparent plates, whereupon the transparent plates are brought together again, to clamp the transparency between them to hold it frictionally in place. The same procedure may be followed where the transparency is one of a series of images on a short strip of film, too short to be reeled and handled in the manner of a long roll or strip. But when the transparency constitutes one frame or image on a long strip such as a roll of motion picture film or similar film for use in a still camera, then suitable means is provided for handling the roll of film and for moving it quickly past the optical axis of the condensing lens system, to bring any selected image into proper projecting position.

This means for handling the roll of film is not essential to the present invention, and so need not be described in detail. It is sufficient to say that the means includes a bracket 171 (Fig. 7) extending upwardly from the top of the condenser housing 121, on which is adjustably mounted a somewhat Y-shaped bracket (Figs. 1 and 7) in which is journaled an approximately horizontal shaft having its forward end of the usual partly square and partly circular cross section, to receive a film reel 179 of usual or standard construction. A sprocket 181 (Fig. 7) is fixed to this reel shaft.

A casing 185 extends downwardly from the bottom of the condenser lens housing 121, and one face of this casing is provided with a vertical guideway on which another similar Y-shaped bracket 189 is mounted in a position inverted with respect to that of the first Y-shaped bracket. This second Y-shaped bracket also carries a reel shaft likewise having one end which is partly circular and partly squared, to receive the film reel 195 (Figs. 1 and 7). This second reel shaft carries a sprocket 197.

A strip of film wound on the upper reel 179 may extend downwardly therefrom, over a guide roller 201 (Fig. 7) thence downwardly between the two transparent plates, to a second guide roller 205 below the transparent plates, and thence to the lower film reel 195, the film being designated in Fig. 7 by the letter F.

A crank 211 is provided for feeding the film in either direction from one reel to the other. The shaft of this crank carries two sprockets, one of which is connected by a drive chain 233 (Fig. 7) with the sprocket on the lower reel shaft, and the other of which is connected by a drive chain 237, passing over an idler sprocket 235, to the sprocket on the upper reel shaft.

Suitable mechanism, which need not be described here, is provided for driving one of the drive chains but not the other, when the crank 211 is turned in one direction, and for driving the other drive chain, but not the first one, when the crank is turned in the opposite direction, and for opening up or separating the two transparent plates while the crank is being turned in either direction, so that these plates do not bear against the moving film to damage it.

The transparency holding and light projecting assembly above described is preferably mounted in such position that it projects the light rays through the transparency and along an optical axis which is approximately horizontal and which intersects the main horizontal optical axis of the camera at approximately a right angle thereto. At the intersection of these axes there is placed a lens and prism assembly, which will now be described with special reference to Figs. 6 to 12, inclusive.

The lens and prism assembly includes a casing 301 removably mounted in a light-tight manner on the front of the housing 81 as by means of a releasable spring latch 303 near its top and a nut 305 near its bottom. This casing 301 is so shaped as to fit over the usual opening in the front of the housing 81 and to be interchangeable with the usual lens and prism assembly, well known in the art and not here shown, which is customarily used with "Photostat" copying cameras of this type. Thus the usefulness of the camera as an ordinary commercial copying camera is not destroyed by the use of the present invention, for the special lens and prism assembly of the present invention may be removed whenever desired and the standard lens and prism assembly for normal photographing operations can be substituted, thus putting the camera back in condition to be used for ordinary commercial copying operations.

The special lens and prism assembly of the present invention comprises, within the casing 301, a rotatable sleeve or barrel 311, shown separately in Fig. 12, one side of which is cut away as at 313. An arm 315 fixed to this sleeve 311 extends radially outwardly through a slot in the casing 301 to an accessible position so that, by grasping the projecting end of the arm, the sleeve 311 may be turned in the casing 301 through 90° about an axis coinciding with the optical axis of the light projecting assembly above described. The ends of the slot through which the arm 315 extends serve as stops to limit the turning movement of the sleeve.

Mounted stationarily within the sleeve 311 to turn bodily therewith when the sleeve is turned, is suitable light bending means, such as a mirror, or preferably, a prism 317, so arranged that light rays approaching the bending means from a lateral direction (along the axis of the light projecting assembly) will be bent through approximately 90° and will issue in a direction toward the cut out side 313 of the sleeve 311. Associated with this light bending means is a suitable lens system, the details of which form no part of the present invention, any suitable lens system of known form adapted to the requirements of the size of the camera being usable. The lens system may be made up of one or more lenses or compound lenses, one lens being indicated in Fig. 11 at 321 and another at 323. They are mounted in a lens tube 325 which extends out through a lateral opening in the casing 301 as shown, and which is fixed to the sleeve 311 (or to a transverse plate 327 which is in turn fixed to the sleeve) so as to turn bodily therewith.

When the parts are in the position shown in Figs. 7, 8, 10, and 11, the cut out portion 313 of the sleeve 311 is faced downwardly, opposite an opening 331 in the bottom of the casing 301. In this position, light projected through the transparency held between the plates 149 and 163 will pass along the optical axis indicated at A, will enter the special lens and prism unit, and will be bent by the light bending means 317 so as to pass downwardly along the optical axis indicated at B, toward the copyholder 77 or a screen placed thereon as indicated in Fig. 1. In this position, no light enters the camera.

Figure 2:
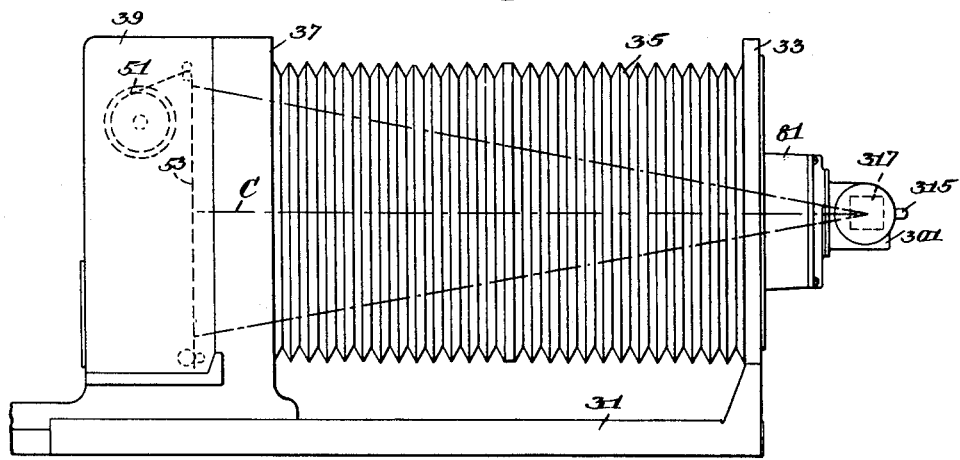
Fig. 2 is a similar view of a portion of the apparatus shown in Fig. 1, with the parts shifted to a different position so that the enlarged image is projected onto the photo sensitive material in the focal plane of the camera.

If the parts be turned 90° from this position, to the other position illustrated in Figs. 2, 6, and 9, then the cut out portion 313 in the sleeve 311 will no longer be opposite the opening 331 in the bottom of the casing 301, but will be opposite another opening 333 in the rear of the casing. The light projected through the transparency will now enter the light bending unit as before, but instead of being projected downwardly along the optical axis B, it will now be projected rearwardly, through the opening 333 and into the camera, along the optical axis indicated at C, and will fall upon the photo sensitive material 53 in the focal plane of the camera during such time as the shutter 89 is open. Thus, by manipulating the lever 315 which controls the position of the sleeve 311, it is possible to project the image of the transparency either downwardly onto the copyholder or a viewing screen mounted thereon, or rearwardly into the camera and onto the photo sensitive material therein. By turning the adjusting screw 117, focusing may be accomplished so that a sharp image is obtained on the viewing screen, and means is provided, as described below, for placing the focal plane of the camera at the same distance from the light bending unit as the viewing screen, thus insuring that when an image properly focused on the viewing screen is transferred to the photo sensitive material, it will be equally well focused thereon.

It is seen that the lens and prism, collectively, may be properly described as a catadioptric unit, or as catadioptric media, since the lenses 321 and 323 produce refraction of light rays, while the prism 317 produces reflection of light rays. The same identical catadioptric unit or catadioptric media is employed both in projecting light onto the viewing screen and in projecting light onto the sensitized sheet material or film, thus eliminating errors which might be caused by the use of different optical parts for projecting the light rays along the two different paths.

It is desirable to provide an adjustable iris diaphragm in connection with the lens, and if such a diaphragm is employed, it is also desirable to have this diaphragm automatically operated to open it wider when the light rays are projected downwardly onto the viewing screen than when the light rays are projected rearwardly onto the focal plane of the camera. In the preferred construction, the iris diaphragm, of any suitable known construction, is indicated in Fig. 9 at 341. The diaphragm leaves may be placed, for example, either in front of the first lens 323, or in the space between this lens and the second lens 321. The blades are opened and closed in known manner by turning the usual adjusting ring 343, operatively connected to the diaphragm blades and mounted for rotation around a central tube 345 which is stationary with respect to the lenses. In the preferred construction, a pin 347 (Figs. 8 and 9) projects radially from the adjusting ring 343 and lies in the plane of two adjustable stops 349 and 351 mounted on the side wall of the casing 301 and adjustable through a limited range upon loosening the holding screws 353.

When the sleeve 311 is in the position shown in Figs. 8, 10, and 11, to project light downwardly along the axis B, the iris diaphragm is wide open to its maximum position, with the pin 347 in contact with the stop 351. As the sleeve 311 and handle 315 are turned in a counterclockwise direction from the position shown in Fig. 9 to the position shown in Fig. 10, to project light along the axis C, the adjusting ring 343 and pin 347 tend to turn with the other parts, and may do so through a limited range, until the pin comes into contact with the other stop 349. Then further turning movement of the adjusting ring 343 is prevented, although the other parts 311 and 345 continue to turn, so that a relative turning takes place between the adjusting ring and the other parts on which the iris diaphragm is mounted, with the result that the iris diaphragm is partially closed as indicated in Fig. 9. When the sleeve 311 is turned back to the position shown in Fig. 8 to project light once more along the axis B, the adjusting ring turns with the other parts until the pin 347 comes in contact with the stop 351, which prevents further movement of the adjusting ring and thus opens the iris diaphragm as movement of the other parts continues.

The purpose of this opening and closing of the diaphragm is twofold. First, it is usually desirable when making a photographic print with this type of camera, to make a relatively long exposure, usually of several seconds duration, in order that the exposure time may be more accurately controlled and that small variations therein may be of less consequence in causing under exposure or over exposure. It is seen that when the proper length of exposure for a given emulsion and given lighting conditions is eight seconds, accidental variation of one second is of much less consequence than the same variation of one second in an exposure which should be of only two seconds duration. Partially closing the diaphragm when the exposure is to be made increases the necessary time of exposure, over what it would be if the diaphragm remained fully open, thus adding to the ease of control of the exposure as above explained. At the same time, it is desirable that the diaphragm be as wide open as possible when the light rays are projected onto the viewing screen, in order to get as brilliant an image as possible for viewing or inspection purposes. The change in the diaphragm setting, preferably made automatically as above explained, thus enables the maximum brilliance of image on the viewing screen, while at the same time providing a relatively slow exposure, the time of which can be more easily controlled than if the image projected onto the photo sensitive material were of the same brilliance as that projected onto the viewing screen.

The second reason for stopping down or partially closing the diaphragm when making an exposure, relative to its position when projecting on the viewing screen, is that this procedure increases the depth of focus when the image is projected into the camera with respect to the depth of focus when the image is projected on the viewing screen, and thus greatly improves the focusing characteristics of the apparatus. The depth of focus of any given lens or lens system, when the focal length remains constant, varies inversely with the aperture. Consequently, when the iris diaphragm is stopped down to reduce the aperture of the lens system, the depth of focus thereof is correspondingly increased. As explained below, means is provided for placing the focal plane 53 at the same distance from the lens and prism assembly as the viewing screen. If the depth of focus of the optical system when focused upon the viewing screen is less than when focused upon the focal plane 53 placed at the same distance as the viewing screen, it follows that if the image is not exactly perfectly focused on the viewing screen, it will nevertheless be sharper and better focused when it is transferred to the sensitized material on the focal plane 53, because of the increase in the depth of focus caused by the decrease of the aperture or diaphragm opening. With this arrangement, it is not necessary to take the highest degree of care in focusing the image on the viewing screen, because so long as the image is reasonably well focused on the viewing screen, it will be focused more sharply and perfectly satisfactorily on the photo sensitive material in the camera when the photoprint is made.

Figure 3:
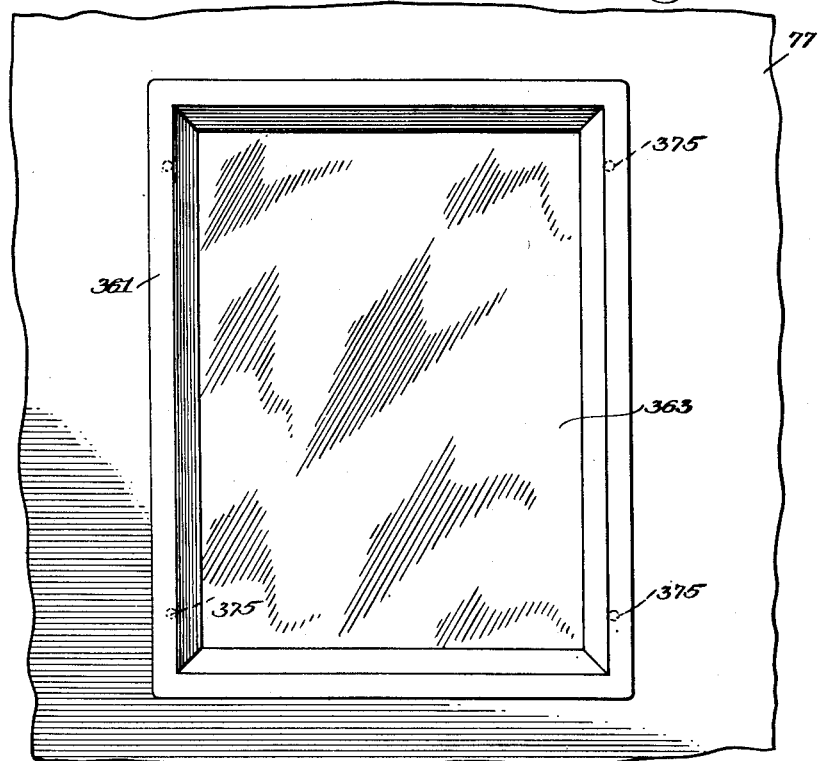
Fig. 3 is a plan of the viewing screen assembly.

When the image of the transparency is to be focused in a position to be viewed or read, it may, as stated, be focused directly on the flat copyholder 77 (Fig. 1) but it is preferable to use a viewing screen such as shown in Figs. 3, 4, and 5. In its preferred form, the viewing screen includes a rectangular frame 361 in which is mounted a glass plate 363 on the bottom surface of which is the screen itself, indicated at 365, of any suitable known kind (preferably fabric) found to be useful in receiving projected images. Suitable resilient means, such as corrugated fiber board 367, is placed beneath the screen 365 to hold it up tight against the glass 363, and the corrugated board 367 is backed up by a stiff bottom plate 369 secured to the frame 361 as by screws 371.

In order to locate this screen properly on the board 77 in position centered beneath the lens and prism unit, the screen assembly preferably has a plurality of downwardly projecting pins 375, four of them being indicated in Fig. 3, which fit loosely into holes in the top of the board 77, so placed that the screen is properly centered beneath the prism when the pins are in the holes.

If the apparatus is used in a room where there is considerable general illumination, it may be advisable, in order to make the image on the screen somewhat clearer, to employ a shadow box 379 (Fig. 1) around the screen assembly. This shadow box comprises four walls of sheet metal or other suitable stiff opaque material, hinged to each other at their ends to form a parallelogram which can be erected into a rectangle or collapsed into flat form. When erected into rectangular form, the shadow box is placed around the screen frame 361 with the lower edges of the box resting on the board 77, and with the side walls projecting upwardly for a substantial distance around the viewing screen so as to help in keeping stray light off the screen without interfering with the light purposely projected onto the screen as indicated in Fig. 1.

In order to enable the focal plane 53 of the camera to be placed easily and quickly at exactly the same distance from the lens and prism unit as the viewing screen 365, the camera body is provided with a pointer 383 cooperating with a graduated scale 385 on the frame 31, and the adjustable bracket 71 is provided with a pointer 387 cooperating with a graduated scale 389 on the frame. It is immaterial in what units the scales 385 and 389 are graduated, whether they be linear units of measure, in inches, in centimeters, or other units, or whether they be graduated according to any arbitrary or fanciful scheme, so long as each scale is provided with letters, numbers, signs, or other indicia indicating corresponding positions on the two scales which will provide equal distances of the focal plane 53 and the screen 365 from the axis of rotation of the lens and prism unit. In other words, any suitable series of numbers, letters, marks, signs, or other indicia can be placed on the scale 385, so long as the same series of indicia is placed on the scale 389 in corresponding positions so that when the pointer 383 is set to a given letter, number, etc., on the scale 385, a setting of the pointer 387 at the same letter, number, etc., on the scale 389 will place the screen 365 at the same distance from the lens and prism as the distance between the photo sensitive material 53 and the lens and prism. Numerals reading in linear units of measure (such as inches) constitute the preferable form of graduations of the scales 385 and 389.

In practicing the method of the present invention, the desired transparency is placed between the two transparent plates, and light from the incandescent bulb 133 (Fig. 7) is projected through the condenser lens system within the casing 121 and through the transparency, along the optical axis A, and into the lens and prism unit as indicated, for example, in Figs. 6 and 11. If the lens and prism unit is in the position indicated in Figs. 1, 8, 10, and 11, the light rays will be bent by the light bending means 317 and will pass downwardly along the optical axis B and will fall upon the viewing screen 365 (Fig. 5) held in the frame 361 (Fig. 1) on the copyholder 77.

The image of the transparency may be focused sharply on the viewing screen by turning the adjusting screw 117 (Fig. 6) to move the light projecting and transparency holding unit closer to or farther away from the lens and prism unit. Since the focal length of the lens system in this lens and prism unit is preferably relatively short, only a slight movement of the light projecting and transparency holding assembly is needed to focus for widely different locations of the viewing screen.

If it is desired to make the image larger, the viewing screen is moved downwardly by moving the bracket 71 down along the track at the front of the frame 31. Similarly, if a smaller image is desired, the viewing screen is moved upwardly closer to the lens and prism unit, the image being refocused by the screw 117 after each change in the position of the viewing screen.

If only part of the subject matter of the transparency is desired to be reproduced in the photographic print to be made, a mask of the suitable size and shape to cover the part not wanted, is placed over the face of the glass plate 163 and held in position by the spring clips 165. The mask can be adjusted, altered, or replaced by other masks, very easily and simply, until exactly the right conditions are obtained in the image on the viewing screen.

When the proper position of the viewing screen has been found to make the image of the size desired for the photographic print, then the camera body 37, 39 is moved along its trackway on the frame 31 until the pointer 383 points to the same number or indication on the scale 385, as that which is opposite the pointer 387 associated with the viewing screen. When this correspondence of indicia on the two scales is attained, the photo sensitive material in the focal plane 53 of the camera will be at the same distance from the lens and prism unit as the distance between this unit and the viewing screen, so that it necessarily follows that if the lens and prism unit is turned to transfer the image from the viewing screen to the photo sensitive material, the image will be of the same size as was the case on the viewing screen.

The lens and prism unit is now turned through 90° by bringing the handle 315 down to the position shown in Figs. 2 and 9. This transfers the projected image from the optical axis B to the optical axis C, and when the shutter 89 is opened by a pull on the cord 91, the image will fall on the photo sensitive material at 53 and a photographic exposure will be made. Because of the arrangement of parts above described, the image on the exposure will be of exactly the same size as that previously viewed on the viewing screen, so that it is very convenient for the operator to make any size of print he wishes (within the reasonable limits of the machine) and to cut out or remove any desired part of any given transparency by the use of suitable masks, with complete assurance that when he is satisfied with the result as viewed on the viewing screen, exactly the same result will be obtained in the photographic print.

After the exposure has been made, the winding rolls 55 are operated by the handle 57 to wind down the exposed portion of the sheet material into the developing bath within the tank 61, which exposed portion is then cut off by operation of the severing knife connected to the handle 59. After development has been completed, the print is transferred to the fixing bath within the tank 65 and suitably fixed, after which it is washed and dried, making the completed photographic print.

If more than one print of the same exposure is desired, as many successive prints may be made as necessary, by leaving the lens and prism assembly and other parts set in the same position, without the necessity of throwing the image back onto the viewing screen.

The present application is a division of my parent application, Serial No. 217,710, filed July 6, 1938, for Photographic apparatus. Certain subject matter disclosed but not claimed in the present application is claimed in said parent application, or in another division thereof, Serial No. 270,589, filed April 28, 1939, for Optical projection apparatus.

I claim:

1. The method of making a photographic print of a subject which includes the steps of projecting light rays from said subject along an axis to catadioptric media to bend said rays laterally from said axis and project them upon a receiving surface arranged laterally of said axis to form an image of said subject on said surface for purposes of inspection, inspecting said image by viewing it from the same side of said surface as that from which said rays are projected toward said surface, then turning said catadioptric media about said axis to bend said light rays laterally from said axis in a different direction and project them upon photo sensitive material arranged laterally of said axis in a different direction from the direction of said receiving surface and at the same distance from said axis as said surface, to make an exposure on said photo sensitive material, and then developing and fixing said photo sensitive material to make a photographic print.

2. The method of making an enlarged photographic print of a relatively small subject which includes the steps of projecting light rays from said subject along an axis to catadioptric media to bend said rays laterally in one direction from said axis and project them in a diverging bundle of rays toward a receiving surface to form an enlarged image of said subject on said surface, viewing said image from the same side of said surface as that on which said catadioptric media are located, moving said surface toward or away from said axis to vary the size of the image thereon until the desired size for the photographic reproduction is secured, placing photo sensitive material laterally in a different direction from said axis, moving said sensitive material toward or away from said axis until it is at the same distance therefrom as the distance from said receiving surface to said axis, then turning said catadioptric media about said axis to bend said light rays laterally from said axis in said different direction and project them toward said sensitive material so that said rays fall upon said sensitive material and form thereon an image of said subject of the same size and by the use of the same identical catadioptric media as the image previously formed on said receiving surface, and then developing and fixing said sensitive material to make a photographic print.

3. The method of making an enlarged photographic print of a relatively small subject which includes the steps of illuminating the subject, projecting diverging and enlarging light rays from said subject upon an opaque receiving surface in the open to form an enlarged image thereon, varying the distance between said subject and said receiving surface until said image is of the desired size, then projecting said light rays onto photo sensitive material in a dark chamber while maintaining said receiving surface and said sensitive material in fixed position relatively to each other from the time said rays are last projected onto said receiving surface to the time said rays are first projected onto said sensitive material, and then developing and fixing said sensitive material to make a photographic print.

4. The method of making an enlarged photographic print of a relatively small subject which includes the steps of illuminating the subject, projecting diverging and enlarging light rays from said subject through catadioptric media and along a first optical path and upon a receiving surface to form an enlarged image thereon, varying the distance between said subject and said receiving surface until said image is of the desired size, placing photo sensitive material in a position different from that of said receiving surface and at the same optical distance from said subject as the optical distance of said receiving surface from said subject, then moving said catadioptric media to cause light rays to be projected along an optical path substantially different at least in part from said first optical path, onto said sensitive material, while maintaining said receiving surface and said sensitive material in fixed position relatively to each other from the time said rays are last projected onto said receiving surface to the time they are first projected onto said sensitive material, and then developing and fixing said sensitive material to make a photographic print.

5. The method of making an enlarged photographic print of a relatively small subject which includes the steps of illuminating the subject, projecting diverging and enlarging light rays from said subject along a first optical path and upon a receiving surface to form an enlarged image thereon, varying the distance between said subject and said receiving surface until said image is of the desired size, placing photo sensitive material in a position different from that of said receiving surface and at the same optical distance from said subject as the optical distance of said receiving surface from said subject, then projecting said light rays along an optical path substantially different at least in part from said first optical path, onto said sensitive material, with reduced intensity relatively to the intensity of the rays projected upon said receiving surface, to produce a less brilliant image on said sensitive material than that produced on said receiving surface, and then developing and fixing said sensitive material to make a photographic print.

PAUL LANDROCK.

CERTIFICATE OF CORRECTION.

Patent No. 2,225,747.  December 24, 1940.

PAUL LANDROCK.

It is hereby certified that error appears in the printed specification of the above numbered patent requiring correction as follows: Page 7, first column, line 20, claim 4, after the word "cause" insert --said--; and that the said Letters Patent should be read with this correction therein that the same may conform to the record of the case in the Patent Office.

Signed and sealed this 11th day of February, A. D. 1941.

(Seal)

Henry Van Arsdale,
Acting Commissioner of Patents.